United States Patent
Noffke et al.

(10) Patent No.: US 11,952,981 B2
(45) Date of Patent: Apr. 9, 2024

(54) WIND POWER INSTALLATION AND METHOD FOR CONTROLLING A WIND POWER INSTALLATION

(71) Applicant: Wobben Properties GmbH, Aurich (DE)

(72) Inventors: Nils Noffke, Aurich (DE); Uli Krause, Westerholt (DE); Tilko Nietsch, Wiesmoor (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/703,727

(22) Filed: Mar. 24, 2022

(65) Prior Publication Data
US 2022/0307470 A1    Sep. 29, 2022

(30) Foreign Application Priority Data

Mar. 25, 2021 (DE) .......................... 102021107555.6

(51) Int. Cl.
| | | |
|---|---|---|
| F03D 7/02 | (2006.01) | |
| F03D 9/25 | (2016.01) | |
| F03D 15/20 | (2016.01) | |
| H02P 9/04 | (2006.01) | |
| H02P 101/15 | (2016.01) | |

(52) U.S. Cl.
CPC ............. *F03D 7/0276* (2013.01); *F03D 9/25* (2016.05); *F03D 15/20* (2016.05); *H02P 9/04* (2013.01); *H02P 2101/15* (2015.01)

(58) Field of Classification Search
CPC .......... F03D 7/0276; F03D 15/20; F03D 9/25; H02P 9/04; H02P 2101/15
See application file for complete search history.

(56) References Cited

U.S. PATENT DOCUMENTS

| | | |
|---|---|---|
| 6,194,800 B1 | 2/2001 | Maruyama et al. |
| 6,541,877 B2 | 4/2003 | Kim et al. |
| 7,098,550 B2 | 8/2006 | Wobben |
| 8,653,703 B2 | 2/2014 | Kori et al. |
| 8,729,722 B2 | 5/2014 | Damen et al. |
| 9,143,071 B2 | 9/2015 | Diedrichs |

(Continued)

FOREIGN PATENT DOCUMENTS

| | | |
|---|---|---|
| CN | 103181066 A | 6/2013 |
| CN | 103609017 A | 2/2014 |

(Continued)

OTHER PUBLICATIONS

"Simulation of Air-Gap Noise of New Energy Automobile Motor"; Xiaolong Zhang et al 2019 IOP Conf. Ser.: Mater. Sci. Eng. 490 072027 (Year: 2019).*

*Primary Examiner* — Sean Gugger
(74) *Attorney, Agent, or Firm* — Seed IP Law Group LLP (57) ABSTRACT

Provided is a method for controlling a wind power installation, the wind power installation having a generator for the generation of electric current, the generator having an air gap with a variable air gap thickness, the wind power installation being controlled in a part load range by means of a control regulation, the wind power installation being controlled in a manner which is dependent on the air gap thickness, the control regulation being selected or set in a manner which is dependent on the air gap width.

16 Claims, 4 Drawing Sheets

(56) References Cited

U.S. PATENT DOCUMENTS

| | | | |
|---|---|---|---|
| 9,624,908 B2 | 4/2017 | Airoldi et al. | |
| 2006/0033339 A1* | 2/2006 | Pasuri | F03D 7/0276 290/44 |
| 2013/0175896 A1 | 7/2013 | Yabe et al. | |
| 2014/0054897 A1 | 2/2014 | Casazza et al. | |
| 2014/0133985 A1 | 5/2014 | Mongeau | |
| 2015/0102605 A1 | 4/2015 | Giengiel | |
| 2015/0265987 A1 | 9/2015 | Kidd | |
| 2016/0245559 A1 | 8/2016 | Yang et al. | |
| 2017/0214298 A1 | 7/2017 | Coldwate et al. | |
| 2019/0113020 A1* | 4/2019 | Messing | F03D 7/0224 |
| 2019/0390657 A1 | 12/2019 | Zeichfüssl | |
| 2020/0149514 A1 | 5/2020 | Schaper et al. | |
| 2020/0244202 A1* | 7/2020 | Piazza Galarza | H02P 23/14 |
| 2022/0154689 A1 | 5/2022 | Von Aswege | |

FOREIGN PATENT DOCUMENTS

| | | |
|---|---|---|
| CN | 203722413 U | 7/2014 |
| CN | 105917179 A | 8/2016 |
| DE | 196 52 673 A1 | 6/1998 |
| DE | 102014208791 A1 | 11/2014 |
| DE | 10 2016 106 590 A1 | 10/2017 |
| DE | 10 2017 107 897 A1 | 10/2018 |
| DE | 10 2019 117 477 A1 | 12/2020 |
| EP | 1237263 A2 | 9/2002 |
| EP | 2372881 A2 | 10/2011 |
| EP | 2 532 885 A1 | 12/2012 |
| EP | 2806542 A1 | 11/2014 |
| EP | 2852037 A1 | 3/2015 |
| EP | 3 503 358 A1 | 6/2019 |
| EP | 3 686 409 A1 | 7/2020 |
| JP | 2000-324755 A | 11/2000 |
| RU | 2599411 C2 | 10/2016 |
| WO | 02/086313 A1 | 10/2002 |
| WO | 2004/034549 A1 | 4/2004 |
| WO | 2020/178182 A1 | 9/2020 |

* cited by examiner

WIND POWER INSTALLATION AND METHOD FOR CONTROLLING A WIND POWER INSTALLATION

BACKGROUND

Technical Field

The present invention relates to a wind power installation, and it relates to a method for controlling a wind power installation.

Description of the Related Art

Wind power installations are known; they generate electric current from wind with the aid of a generator. In addition to an electric current, the rotation of the generator can also generate unwanted noise. In particular, the generator can emit noise or sounds which lead to a tonality. A tonality can be a noise which is perceived substantially as monotonous. A tonality of this type can usually be generated by way of a consistently rotating generator of a gearless wind power installation, and can lie in the range of medium to low frequency of the audible spectrum. The cause can lie in the excitation of a mechanical vibration as a result of magnetic interaction between the rotor and the stator of the generator. The interacting forces between the rotor and the stator also change constantly as a result of the circulation of the rotor, as a result of which the mechanical excitation can arise at a consistent frequency.

The problem occurs in particular in the case of generators of gearless wind power installations because they run very slowly. In the case of a wind power installation with a gear, the generators rotate much more rapidly, which would firstly lead to a different frequency range, but in particular generally leads to a significantly lower excitation of mechanical vibrations between the rotor and the stator.

The generated noise can be detected at the wind power installation and/or a relevant emissions point and, if it was detected here that limit values for the generated noise were exceeded, the operation of the wind power installation can be modified correspondingly. In particular, the rotational speed can be decreased. A spontaneous rotational speed reduction of this type can lead, however, to an unfavorable operating point, as a result of which an operating point which is not foreseen and is usually unfavorable here can arise.

BRIEF SUMMARY

Provided herein is controlling a tonality in a targeted manner, in order to keep the tonality below predefined limits, it additionally being possible for as satisfactory an operating point as possible to be achieved.

A method is proposed. The method proceeds from a wind power installation which has a generator for the generation of electric current. The generator has an air gap with a variable air gap thickness. The air gap is formed between the rotor and the stator of the generator. The air gap has a variable air gap thickness in particular by virtue of the fact that it can change in a manner which is dependent on the temperature.

In particular, an internal rotor is provided here, in the case of which the rotor therefore rotates in the stator. If the stator heats up here, it can expand as a result and can increase in size in comparison with the rotor. The air gap thickness is increased as a result.

The wind power installation is controlled in a part load range by means of a control regulation. The method relates generally to the operation of the wind power installation and therefore of the generator in the part load range. The part load range can be defined as the range in which the wind speed lies below a nominal wind speed.

In this part load range, the wind power installation is therefore controlled by means of a control regulation. A control regulation is, in particular, a control regulation, in the case of which an output variable, in particular power output or torque of the generator, is set in a manner which is dependent on an input variable, for example the rotational speed.

It is proposed to this end that the control regulation is selected or set in a manner which is dependent on the air gap thickness. Here, a change in the shape of the air gap can also occur if namely an asymmetrical deformation results. The shape can change both in the circumferential direction and in depth. The control regulation therefore specifies a relationship between an input variable and an output variable, and this relationship is selected or set in a manner which is dependent on the air gap thickness. The relationship can be predefined, for example, as a function with at least one functional parameter, for example by way of a polynomial function, and at least one parameter of this function can be set. A characteristic curve can also be used, however, it being possible for this characteristic curve to be selected from a large number of previously calculated characteristic curves. This selection of the characteristic curve can also be understood to be setting of the control regulation. In that case, the control regulation is therefore set by way of this selection.

It has been recognized here, in particular, that the air gap thickness can influence a noise level generated by way of the generator. If this noise level is too high, an operating point of the wind power installation can be changed correspondingly. It is also proposed here that this change takes place by virtue of the fact that not only the current operating point is changed, but rather that the control regulation is changed. The operating point can then be changed in a targeted or at least more targeted manner by way of the application of the amended control regulation.

It has been recognized here, in particular, that a control regulation is predefined in such a way that it leads in each case to satisfactory operating points. The control regulation can be developed and tested in advance for this purpose, for example by way of corresponding simulations. In particular, these different control regulations or control regulations which can be set in different ways can be developed in each case beforehand, in order to lead in each case to satisfactory operating points.

In particular, an operating point which is highly suitable is found. It is to be noted, furthermore, that the wind speed can change constantly. This can be taken into consideration satisfactorily by way of the selection or setting of the control regulation in a manner which is dependent on the air gap thickness. Changes in the wind speed are then namely taken into consideration by virtue of the fact that the wind power installation is controlled correspondingly by means of the control regulation. A changed wind speed therefore leads to a different operating point, and the latter can be set by means of the control regulation. An operating point which is changed in this way has therefore then likewise been set in a manner which is dependent on the air gap thickness.

This is based, in particular, on the recognition that a generator can excite mechanical vibrations to a greater extent in the case of a smaller air gap thickness than in the case of a greater or great air gap thickness. Therefore, if the air gap thickness is small, the specification of a lower rotational speed can be more appropriate than if the air gap thickness were great or at least greater.

This phenomenon is therefore taken into consideration in the long term by way of the specification of the control regulation in a manner which is dependent on the air gap thickness. At the same time, an aerodynamic operating point can be achieved by way of a corresponding control regulation. Put in a somewhat simplified manner, a control regulation of this type can also achieve a situation, for example, where the rotational speed is in general selected to be somewhat smaller in the case of a small air gap thickness than in the case of a great or greater air gap thickness. If an operating characteristic curve is used, which is still to be described below, this can correspond to a shift of the operating characteristic curve.

It has also been recognized here that, although a certain tonality which has been identified as a particular problem can be dependent on the rotational speed, this does not have to mean that a corresponding rotational speed would always have to be avoided. Rather, it comes down to the interplay of various variables.

By way of example, it is to be pointed out, in particular, that a higher wind speed also leads to the wind itself leading to a higher development of noise. As a result, a tonality can also be perceived more slightly, with the result that it may possibly even be louder.

Secondly, however, a reduced power output also leads to weaker forces in the generator, that is to say to weaker forces between the rotor and the stator. As a result, the excitation of mechanical vibrations is likewise decreased. The mechanical vibrations are therefore decreased and therefore also the resulting noise level.

It is preferably proposed that, in the case of a decrease in the air gap thickness, the control regulation is changed in such a way that the power output decreases. If the control regulation provides the setting of the power output in a manner which is dependent on the rotational speed, it is therefore preferably proposed, in the case of a decrease in the air gap thickness, for the power output to be decreased at an identical rotational speed. A characteristic curve, in the case of which the power output is plotted against the rotational speed, would therefore be flatter, or would be shifted to the right.

It is proposed in accordance with one aspect that the control regulation comprises an operating characteristic curve control operation, in the case of which the generator state variable which is to be set is set by means of an operating characteristic curve, the operating characteristic curve specifying a relationship between a detected rotational speed and the generator state variable which is to be set, and an operating characteristic curve being selected or modified in order to select or set the control regulation.

In particular, a generator power output or a generator torque is provided as generator state variable to be set. In the first case, a rotational speed/power output characteristic curve then arises as operating characteristic curve, whereas a rotational speed/torque characteristic curve arises as operating characteristic curve in the second case.

The control of the wind power installation by means of a rotational speed/power output characteristic curve (the same arises, mutatis mutandis, for the use of a rotational speed/torque characteristic curve) can be explained as follows. The characteristic curve (that is to say, the operating characteristic curve) can be specified by way of a multiplicity of value pairs or else by way of a functional algorithm. The operating characteristic curve then describes a relationship between a detected rotational speed and an output power to be set of the generator. As an alternative, the output power of the wind power installation overall can also be used here by the way.

If, for example, the wind speed increases, the wind introduces more power, which leads to an increase in the rotational speed. A new, namely higher, power value is then set in accordance with the operating characteristic curve. If this corresponds to the power input by way of the wind, the result is a stable operating point. If this power does not yet correspond to the power input by way of the wind, the rotational speed increases further and, in accordance with the operating characteristic curve, leads to a new, namely higher, value for the power to be set. This change in the power is carried out until a stable operating point and therefore a fixed rotational speed arise.

If the operating characteristic curve is then selected or modified in a manner which is dependent on the air gap thickness, the air gap thickness can be taken into consideration for the entire rotational speed range as a result.

Therefore, a general relationship between rotational speed and power output or correspondingly between rotational speed and torque can be specified by way of the operating characteristic curve, which general relationship takes into consideration the air gap thickness and, as a result, can also take into consideration the development of noise, that is to say, in particular, a noise level or sound pressure level. This consideration therefore takes place not only for the current or currently modified operating point, but rather for all operating points.

The use of a suitable operating characteristic curve can also anticipate a further change in the air gap thickness, in particular in a manner which is dependent on the rotational speed.

In particular, the air gap thickness can be dependent on the temperature of the generator, which will be described in further detail below. If the rotational speed then rises, the associated power output or the associated torque is known via the operating characteristic curve, and the heat generation in the stator is also known therefrom. The heat generation in the stator can be a substantial reason for the temperature or at least a temperature change of the generator. The selected operating characteristic curve can therefore take into consideration that the temperature of the generator would increase if the wind speed and therefore the rotational speed should rise. A further increase in the air gap thickness can then correspondingly be anticipated, and the result (namely, a reduction in the generated noise level or sound pressure level) can already be taken into consideration in the operating characteristic curve.

It is proposed in accordance with one aspect that, in order to control the wind power installation in a manner which is dependent on the air gap thickness, in particular in order to select or set the control regulation in a manner which is dependent on the air gap thickness, the air gap thickness is detected by means of sensors. Here, in particular, distance sensors come into question which can be arranged at selected points in or next to the air gap.

Moreover or as an alternative, it is proposed that the air gap thickness is estimated from at least one detected temperature or temperature distribution. Here, the temperature of the stator and of the rotor can be measured, in order to derive the expansion of these two elements from the temperature and to extrapolate the air gap thickness therefrom. Relationships of this type can be determined empirically, or can be determined in simulations. In particular, in the case of a permanently excited synchronous generator which is configured as an internal rotor, a small amount of temperature fluctuation of the rotor is to be expected, at least in comparison with the stator, and therefore a small amount of size change. The detection of the temperature of the stator can then be sufficient. The resulting size change of the stator and therefore the change of the air gap thickness can then be derived. This consideration is already based on a distribution of the temperature to be expected. It also comes into question, however, to detect a temperature distribution.

A combination of the detection and estimation of the air gap thickness also comes into question, in the case of which the detected temperature can be used in addition. An adaptive method also comes into question, in the case of which the air gap thickness is detected by means of sensors and is assigned to correspondingly detected temperatures. As a result, the air gap thickness can then be derived from the detected temperature. Here, in particular, a learning method is proposed, in the case of which relationships between the detected temperature and the air gap thickness are recorded gradually during running operation. Based on this, a later check can also take place, according to which measured values of the sensor for the detection of the air gap thickness are checked on the basis of the detected temperature for plausibility, in order to rule out a sensor fault.

Moreover or as an alternative, it is proposed that the air gap thickness is estimated from at least one radial acceleration value. Here, in particular, the interaction between the rotor and the stator during the rotation of the rotor can lead to a mechanical excitation, already described above, in particular of the stator. This mechanical excitation is, in particular, a movement in the radial direction. In other words, during the rotation of the rotor, the stator is constantly attracted towards the rotor and repelled from it again in an alternating manner as a result of magnetic forces. This force direction is likewise directed substantially in the radial direction, and this constantly changing movement therefore also comprises an acceleration in the radial direction. This acceleration can be detected, and the air gap thickness can be derived therefrom.

Here too, relationships of this type can be determined in simulations or apparatuses with a corresponding measuring sensor system. Here too, an adaptive or learning method can come into question. Even a combination with sensors which directly detect the air gap thickness comes into question. The combination can be configured in the way which was explained for the combination between detection of the air gap thickness by means of sensors and estimation from the detected temperature.

A combination of the estimation via the detected temperature and the radial acceleration value can be performed, for example, by way of a mean value formation or by way of different weighting. Therefore, the air gap thickness can be estimated from the detected temperature and, moreover, from the radial acceleration, and a mean value can be formed from the values of the air gap thickness which are estimated in this way.

Moreover or as an alternative, it comes into question that the air gap thickness is taken into consideration indirectly via parameters which influence the air gap thickness. Parameters of this type can be, in particular, the output power, the torque which is set or a stator voltage. Parameters of this type characterize the operation of the generator and therefore also its load. The load in turn can influence the temperature and, as a result, the air gap thickness can be influenced. An indirect consideration describes the proposal that the selection or the setting of the control regulation already takes place directly in a manner which is dependent on parameters of this type. In particular, the operating characteristic curve can be selected in a manner which is dependent on this. Here, the air gap thickness is taken into consideration indirectly because it is the underlying basis for the adaptation of the control regulation, without having to be incorporated directly as a variable, however.

This is based, in particular, on the finding that relationships between influencing parameters and the air gap thickness have been detected from tests, whether during running operation and/or simulations, the control regulation is adapted in a manner which is dependent on the air gap thickness, and this two-step dependence can be simplified, by the control regulation being set directly in a manner which is dependent on the parameters which influence the air gap thickness.

In particular, the detected temperature and/or the radial acceleration value can be parameters of this type which influence the air gap thickness. The control regulation, in particular the operating characteristic curve, can then be selected or set directly in a manner which is dependent on the detected temperature and/or on the radial acceleration. As a result, a selection or setting takes place indirectly in a manner which is dependent on the air gap thickness.

It is proposed in accordance with one aspect that the generator state variable to be set comprises or is an output power, a generator torque or an intermediate circuit voltage of an inverter which actuates the generator. It is proposed, in particular, that this generator state variable is set by means of an operating characteristic curve in a manner which is dependent on the detected rotational speed. The generator state variable to be set is a state variable which sets the control regulation. Via this, the interaction between the rotor and the stator can also be influenced, which likewise influences the excitation of the mechanical vibration and therefore has an influence on the noise generation and output of the generator.

Here, the stator current and therefore the magnetic interaction between the rotor and the stator are also influenced via the output power. The magnetic interaction between the rotor and the stator is influenced directly via the generator torque.

In the case of a passive rectifier, in particular, the intermediate circuit voltage can influence the stator current and therefore also the magnetic interaction between the rotor and the stator. In the case of the use of an inverter with a passive rectifier, the stator current results (apart from, of course, from the rotation of the rotor and the setting of the rotor) from the stator-side circuitry. Here, in the case of the passive rectifier, it is arranged between the stator terminals and the DC voltage intermediate circuit. The lower the voltage in the DC voltage intermediate circuit, the greater the voltage drop and therefore the resulting stator current. Therefore, in this case, control of the stator current can be specified via a rotational speed/intermediate circuit voltage characteristic curve. This can also form an operating characteristic curve.

All of these three generator state variables are preferably set in a manner which is dependent on the detected rotational speed. As has been recognized here, the rotational speed is an essential variable for the noise generation, both with regard to amplitude and also with regard to frequency. The generator state variable likewise influences the noise development, as has been explained above. It is therefore proposed for these two variables, that is to say firstly the rotational speed and secondly the generator state variable, to be tuned to one another. In other words, an excessive development of noise due to the rotational speed can be counteracted by way of setting of the generator state variable. If the rotational speed leads to a low development of noise which still lies below predefined limits, the generator can likewise be utilized to an even greater extent, that is to say can be maxed out, by way of corresponding setting of the generator state variables.

It is proposed in accordance with one aspect that the wind power installation is configured as a gearless wind power installation. It has been recognized, in particular, that a gearless wind power installation has a slowly running generator, in particular an annular generator, in the case of which the magnetically active elements are situated in an annular region which is arranged at least (in relation to the radius) in the outer half, in particular the outer 70% of the generator. It has been recognized in the case of an annular generator of this type or overall in the case of a situation of this type of a gearless wind power installation that not only the development of noise is linked to this type of wind power installation or this type of generator, but rather that a consideration of the varying air gap thickness can also afford advantages here.

Moreover or as an alternative, the generator is configured as a permanently excited synchronous generator. It has been recognized here, in particular, that, as a result of the permanent excitation, namely of the rotor, the latter is hardly subjected to a development of temperature as a result of operation and/or load of the generator. The stator is subjected to an operation-induced loading of this type, however, and its temperature and therefore also its expansion fluctuate to a much more pronounced extent as a result. The air gap can change as a result of these temperature fluctuations of the stator, in particular, because there is this difference between the rotor and the stator. This has been recognized and taken into consideration.

Moreover or as an alternative, it is proposed that the generator is configured as an internal rotor. In combination, in particular, with the permanently excited synchronous generator, this leads to the stator lying on the outside and being heated to a more pronounced extent than the internal rotor, with the result that the temperature-induced expansion of the stator leads to an increase in the air gap. This behavior can be taken into consideration, in particular when an indirect consideration of the air gap thickness takes place by virtue of the fact that the control regulation is selected or set in a manner which is dependent on the detected generator temperature. It is then namely taken into consideration that the air gap thickness is greater, and therefore the development of noise is lower, the higher the temperature of the generator.

It is proposed in accordance with one aspect that the control regulation comprises a rotational speed avoidance control operation, in order to control the wind power installation in such a way that the operation of the wind power installation in a rotational speed avoidance range is avoided. The rotational speed avoidance range defines a rotational speed range in which the operation of a wind power installation is to be avoided, and the rotational speed avoidance control operation is selected or set in a manner which is dependent on the air gap thickness. Therefore, a rotational speed avoidance control operation can be selected and, as a result, can then be assigned to the control regulation. The control regulation can also already comprise the rotational speed avoidance control operation and can set the rotational speed avoidance control operation which is present in this way in a manner which is dependent on the air gap thickness.

Moreover or as an alternative, the control regulation is selected or set in such a way that the rotational speed avoidance control operation is selected or set in a manner which is dependent on the air gap thickness. Here, the rotational speed avoidance control operation is therefore a fixed constituent part of the control regulation or a fixed constituent part of many control regulations, from which a selection can be carried out. The corresponding rotational speed avoidance control operation is then also selected at the same time as the selection of the control regulation. This applies similarly if the control regulation is set, that is to say, in particular, parameters of the control regulation are modified; the rotational speed avoidance control operation can then also be set in this way.

The selection of a rotational speed avoidance control operation, whether direct or indirect, means, in particular, that the rotational speed avoidance control operation is supplemented or activated. The setting of the rotational speed avoidance control operation can mean, in particular, that the rotational speed range which is to be avoided is set. It comes into question here, in particular, that, in the case of a large area gap thickness, when little tonality is therefore to be assumed, that is to say when a low noise level is to be expected, the rotational speed avoidance range is selected to be narrower. Otherwise, it can be selected to be wider.

It is proposed in accordance with further aspects that the selection of the rotational speed avoidance control operation comprises an activation or deactivation of a rotational speed avoidance control operation. Moreover or as an alternative, the selection of the rotational speed avoidance control operation can comprise a variable of the rotational speed avoidance range, and, moreover or as an alternative, it can comprise shifting the rotational speed avoidance range, with the result that a center or mean rotational speed of the rotational speed range is modified.

The rotational speed avoidance control operation can also be activated by virtue of the fact that it is always present, but is activated, for example, by way of modification of a multiplying parameter from 0 to another value, in particular 1.

It is proposed in accordance with one aspect that the rotational speed avoidance control operation controls the wind power installation in such a way that the rotational speed avoidance range is passed through rapidly in the case of a decreasing or increasing wind, that is to say a decreasing or increasing wind speed, in order to set an operating point with a rotational speed below or above the rotational speed avoidance range. This can take place, in particular, in such a way that the rotational speed decreases in the case of a decreasing wind, that is to say it approaches the avoidance range from above. When it reaches the rotational speed avoidance range, the state variable (that is to say, in particular, output power or torque of the generator) can be changed in such a way, in particular can be decreased in the case of the two examples, that the rotational speed does not decrease further. This variable can then be modified, namely can be increased in the case of the two examples, only when the generator state variable has reached a predefined value, that is to say the generator power output or the generator torque has decreased to a corresponding value in accordance with the two examples. This takes place in such a way that the rotational speed then decreases further very rapidly, and reaches the lower rotational speed avoidance range or decreases even further.

In the case of an increasing wind speed and therefore an increasing rotational speed, that is to say when the operating point approaches from below, that is to say from lower rotational speeds, the process can be carried out mutatis mutandis. The state variable can then be modified correspondingly when the lower limit of the rotational speed avoidance range is reached. An increase therefore takes place in the case of the generator power output or of the generator torque, as a result of which a further rise in the rotational speed is avoided. The setting of the rotational speed avoidance control operation can also take place, in particular, in such a way that amplification of the increase or decrease in the generator state variable is set correspondingly when the rotational speed avoidance range is reached. If the amplification is set to 0, the rotational speed avoidance control operation is inactive.

It is proposed in accordance with one aspect that the control regulation is selected or set again, in the case of a decreasing air gap thickness, in such a way that the output power is decreased, the generator torque is decreased, and/or the DC voltage intermediate circuit voltage is increased. All three measures lead in each case to a decrease in the magnetic forces in the air gap between the rotor and the stator. Here, the output power, the generator torque or the DC voltage intermediate circuit voltage can form the generator state variable to be set. The control regulation can be configured, for example, as an operating characteristic curve control operation with a corresponding operating characteristic curve, and the reselection or resetting of the control regulation can be carried out in such a way that the operating characteristic curve is shifted. As a result, the current operating point likewise changes, namely with the result that the output power or the generator torque is decreased or the DC voltage intermediate circuit voltage is increased.

Moreover or as an alternative, it is proposed that, in the case of a decreasing air gap thickness, the rotational speed avoidance control operation is activated or is set in such a way that an operation of the wind power installation in a rotational speed avoidance range is avoided. The control regulation is also changed by way of the activation or corresponding setting. Instead of decreasing the magnetic forces in the air gap at a certain rotational speed, or in addition thereto, a correspondingly critical rotational speed range is avoided.

It also comes into question that, in the case of a decreasing air gap thickness, the rotational speed avoidance control operation is set in such a way that the rotational speed avoidance range is increased. This is based here, in particular, on the finding that a development of noise, in particular a tonality, is most pronounced at a critical rotational speed. An excessively pronounced development of noise can already occur in the vicinity of a critical rotational speed of this type. It has been recognized here that a reduced air gap thickness leads to a generally increased development of noise, and the critical rotational speed is therefore preferably avoided with a correspondingly greater spacing. This is achieved by way of the increase of the rotational speed avoidance range. Here, the adjusting of the rotational speed avoidance control operation can take place in such a way that corresponding upper and lower rotational speed limits are set. In particular, the rotational speed avoidance range can be defined by way of an upper and a lower limit rotational speed, and these two values can be changed by way of the setting of the rotational speed avoidance control operation.

It also comes into question that, in the case of a decreasing air gap thickness, the rotational speed avoidance range is set in such a way that it is shifted in the direction of a higher or lower rotational speed. This is proposed, in particular, because it has been recognized that the change in the air gap thickness can change the frequency of the tonality. This frequency can both increase and decrease in the case of a decreasing air gap thickness, which can be taken into consideration by way of the shift of the rotational speed avoidance range.

The setting can also be performed by way of a rotational speed-dependent amplification as a relationship between the rotational speed and the generator state variable to be set. This amplification can then be increased with a decreasing air gap thickness for rotational speeds below the rotational speed avoidance range or below a critical rotational speed which lies in the rotational speed avoidance range. The amplification can be decreased with a decreasing air gap thickness for rotational speeds above the rotational speed avoidance range or above the critical rotational speed. These both apply at any rate if the generator state variable is a generator power output or a generator torque. If the generator state variable is the DC voltage intermediate circuit voltage which can also be called the intermediate circuit voltage to simplify things, it would be reversed.

It is proposed in accordance with one aspect that the control regulation is selected or set in a manner which is dependent on a detected and/or estimated air gap thickness and/or in a manner which is dependent on a generator temperature, and that it is additionally selected or set in a manner which is dependent on at least one boundary condition.

The control regulation is thus set in a manner which is dependent on the air gap thickness and in a manner which is dependent on at least one boundary condition. Here, the air gap thickness can be detected directly, for example by way of sensors, and/or can be estimated in some other way, as has already been stated above.

The air gap thickness can also be taken into consideration by the fact that the control regulation is selected or set in a manner which is dependent on a generator temperature. The generator temperature influences the air gap thickness and, based on the determined relationship between the air gap thickness and the generator temperature, the control regulation can be selected or set directly in a manner which is dependent on the generator temperature. Therefore, the indirect path does not need to be followed that the air gap thickness is first of all estimated from the generator temperature, and the control regulation is then selected or set in a manner which is dependent on this estimated air gap thickness.

In addition, at least one boundary condition is taken into consideration as criterion. In particular, at least two or at least three boundary conditions are taken into consideration.

An air density which influences, in particular, the noise propagation comes into question as boundary condition. It has been recognized here, in particular, that it does not necessarily matter what noise level is present at the generator, but which noise level or sound pressure level, that is to say, in particular, which tonality, is present at an emissions point. In other words, the generator may be somewhat louder if the noise is transmitted more weakly, however.

An air pressure and an air humidity can also influence, in particular, the propagation of the sound, and can therefore be taken into consideration as boundary condition.

Moreover, it comes into question for the air density, air pressure and air humidity that this influences the generation of a noise from the movement of the stator of the generator.

A wind speed can influence both the noise propagation and the noise perception. In particular, it has been recognized that the wind can carry a noise with it and, as a result, influences the propagation. Moreover, it has been recognized that, in the case of a strong wind, this already leads to a high noise level, and therefore a noise caused by way of the generator is perceived less and can therefore be louder.

A wind direction is likewise proposed as a boundary condition to be taken into consideration. The wind direction influences, in particular, the propagation of the noise. It has been recognized here, in particular, that wind and therefore the wind direction can develop a directional effect for the noise propagation. Sound propagates, in particular, in the longitudinal direction of the wind direction, both with the wind and counter to the wind, that is to say in both directions.

The consideration of a wind shear and/or atmospheric stratification as a boundary condition is also proposed in addition or as an alternative. A wind shear which indicates how strongly the wind speed changes with height can influence a noise level, in particular a background noise, but can also influence sound propagation. An atmospheric stratification which indicates how strongly air layers are stratified in the vertical direction can influence, in particular, the sound propagation.

In all these cases, it is to be taken into consideration that the control regulation is changed which in turn takes into consideration a further input variable, namely the rotational speed, in particular. This consideration takes place by way of the use of the control regulation in every case. Therefore, this results in a dependence of the control operation in the part load range on at least three variables, namely the input variable of the control regulation, the air gap thickness (whether direct or indirect) and the at least one boundary condition.

It has been recognized here, in particular, that an effect on sound emissions can be predicted satisfactorily by way of the consideration of the stated parameters, that is to say of the input variables and the at least one boundary condition, without it being necessary for this specific sound emission to be detected currently at a relevant emissions point necessarily during running operation.

It is also to be taken into consideration here that a control regulation is selected or set correspondingly. In this way, the control regulation is set or selected in such a way that it leads as far as possible to a predefined sound emissions limit being adhered to at an emissions point. The selection or the setting of this control regulation then leads to it also being possible for this aim to be achieved in the relatively long term in the case of fluctuating wind conditions, since the control regulation is prepared precisely for this purpose.

It is proposed in accordance with one aspect that a setting regulation is used in order to select or set the control regulation in a manner which is dependent on a detected and/or estimated air gap thickness and/or in a manner which is dependent on a generator temperature and in addition in a manner which is dependent on at least one boundary condition. To this end, it is proposed that the setting regulation specifies the selection or setting of the control regulation in such a way that noise emissions of the wind power installation comply with a predefined noise emissions limit at an emissions point.

An emissions point of this type can be a point in the vicinity of the wind power installation at which the sound emissions limit is specified. In particular, this can be a point at which the sound emissions are relevant. For example, a residential building can be situated here.

The selection or setting of the control regulation therefore takes place in such a way that the specified sound emissions limit can be adhered to at the emissions point. This is achieved by way of the setting regulation.

The setting regulation has therefore been created in such a way that relationships between the air gap thickness and the at least one boundary condition firstly and the sound emissions at the emissions point secondly are predictable. Here, the behavior of the wind power installation in accordance with the control regulation to be set or to be selected is also taken into consideration in each case.

The setting regulation can have been created, for example, by way of preliminary tests or simulations. Simulations of this type take the sound propagation into consideration in a manner which is dependent on the boundary conditions. Simulations of this type likewise take the control regulation into consideration, and they then take different operating points into consideration. It comes into question, in particular, that the boundary conditions are specified, for example, for a weather situation, and an operating point is then set in such a way that the sound emissions limit is adhered to precisely at the emissions point. The weather situation can then be varied in the simulation, with the result that different sound propagation conditions are also set. On the basis of this, an associated operating point can again be determined, in the case of which the sound emissions limit is adhered to precisely at the emissions point. In this way, a large number of operating points can be found and can be compiled to form a control regulation.

All of this can be carried out for an air gap thickness and/or a generator temperature.

The operation can then be repeated with different variations. Here, the air gap thickness and/or temperature of the generator can be varied, and/or the boundary conditions, in particular the weather setting.

In this way, various control regulations can be determined, for example various operating characteristic curves, and a suitable assignment in a manner which is dependent on the air gap thickness and the boundary conditions can likewise be recorded.

A simulation of this type can likewise take the operational performance of the wind power installation into consideration and, in particular, can search in each case for an aerodynamically optimum operating point. Each found operating point is therefore distinguished not only by the fact that it adheres to the predefined sound emissions limit, but rather also that it is aerodynamically optimum, that is to say is optimum with consideration of the boundary conditions and the sound emissions limit to be adhered to, and this leads, in particular, to the maximum possible power output being generated.

Here, the setting regulation can also be stored as a multi-dimensional table which assigns in each case one control regulation to the boundary conditions and the air gap thickness and/or temperature.

Instead of in a simulation, a setting regulation can also be created, however, gradually during running operation. To this end, emissions measurements can initially be carried out at the emissions point during running operation, in order to find a control regulation by way of variations, in the case of which the sound emissions limit is adhered to at the emissions point. The boundary conditions including the air gap thickness and/or generator temperature can be recorded. They are assigned a control regulation, or the control regulation is set in a manner which is dependent on them. This relationship forms the setting regulation.

If the setting regulation is stored as tables, corresponding regions of the table can be filled in this way. If the table cannot be filled completely in this way, missing regions can be filled by way of interpolation, and/or targeted operating points can possibly be moved to, in order to fill a part of the table or to configure the setting regulation as a result. In this regard, the setting regulation can also be configured as a single-variable function or multi-variable function.

The result is then that the setting regulation is used in order to select or set the control regulation. Here, the air gap thickness and/or generator temperature and at least one boundary condition are incorporated which then leads via the setting regulation to a corresponding control regulation. The control regulation which is selected or set in this way leads to an optimum control of the wind power installation, in particular with regard to yield, with the sound emissions limit being adhered to at the emissions point.

If, for example, only the air gap thickness and/or the generator temperature then changes, the control regulation can be adapted correspondingly. This can also be carried out by means of the setting regulation. This achieves a situation where the wind power installation can be operated in an optimum manner in the long term. It is avoided that a control regulation is selected or set which is optimum in one moment and adheres to a predefined sound emissions limit at an emissions point, but is not adapted in the case of a change in an air gap thickness and/or generator temperature. The control regulation can be adjusted continuously to the air gap thickness.

It has been taken into consideration here, in particular, that a generator of a wind power installation, in particular a generator which is preferably used here of a gearless wind power installation, can have a large mass and therefore a large thermal capacity. If an operating point therefore changes, for example as a result of a rotational speed increase because the wind speed increases, the generator temperature does not first of all increase. It increases only slowly.

If the newly selected operating point adheres to the sound emissions limit at the emissions point, it might be optimum at the moment. At first, the temperature of the generator and therefore the air gap thickness change, which would permit a change in the operating point while adhering to the sound emissions limit. This change in the operating point can be achieved by way of the selection or the setting of the control regulation in a manner which is dependent on the air gap thickness and/or generator temperature, namely via the change in the control regulation. An optimum operating point can be ensured. Otherwise, the air gap thickness might increase, without the control being adapted. The noise emissions would therefore decrease, with the result that the new situation is maxed out.

The external temperature at the wind power installation can also influence the temperature of the generator, however. If therefore the external temperature increases, for example during the transition from night to day, the generator temperature can also increase and the air gap thickness can increase. It is therefore proposed for this change to be taken into consideration and for the control regulation to be adapted correspondingly. An optimum operating point can therefore then also be achieved in this case. The operating point which has been optimum up to now can therefore be changed, in order to then again achieve an optimum operating point. This takes place via the corresponding selection or setting of the control regulation. The current operating point is therefore always adjusted to an optimum operating point.

A wind power installation is also proposed. The wind power installation has a generator for the generation of electric current, and the generator has an air gap with a variable air gap thickness, a control device (e.g., controller or system controller) being provided which is prepared such that the wind power installation is controlled in a part load range by means of a control regulation, and the control device being prepared such that the wind power installation is controlled in a manner which is dependent on the air gap thickness, the control device being prepared in order that the control regulation is selected or set in a manner which is dependent on the air gap thickness.

It is proposed, in particular, that the wind power installation, in particular the control device, is prepared to carry out a method in accordance with one of the above-described embodiments.

The control device can have, in particular, a process computer, in which the proposed method is implemented. In addition, sensors can be provided, in order to detect the air gap thickness, a generator temperature and/or boundary conditions.

It is proposed in accordance with one aspect that the wind power installation is configured as a gearless wind power installation, and/or that the generator is configured as a permanently excited synchronous generator, and/or that the generator is configured as an internal rotor. The advantages of this have already been described above.

BRIEF DESCRIPTION OF THE SEVERAL VIEWS OF THE DRAWINGS

The invention will now be described in greater detail by way of example below on the basis of embodiments with reference to the figures.

DETAILED DESCRIPTION

Figure 1:
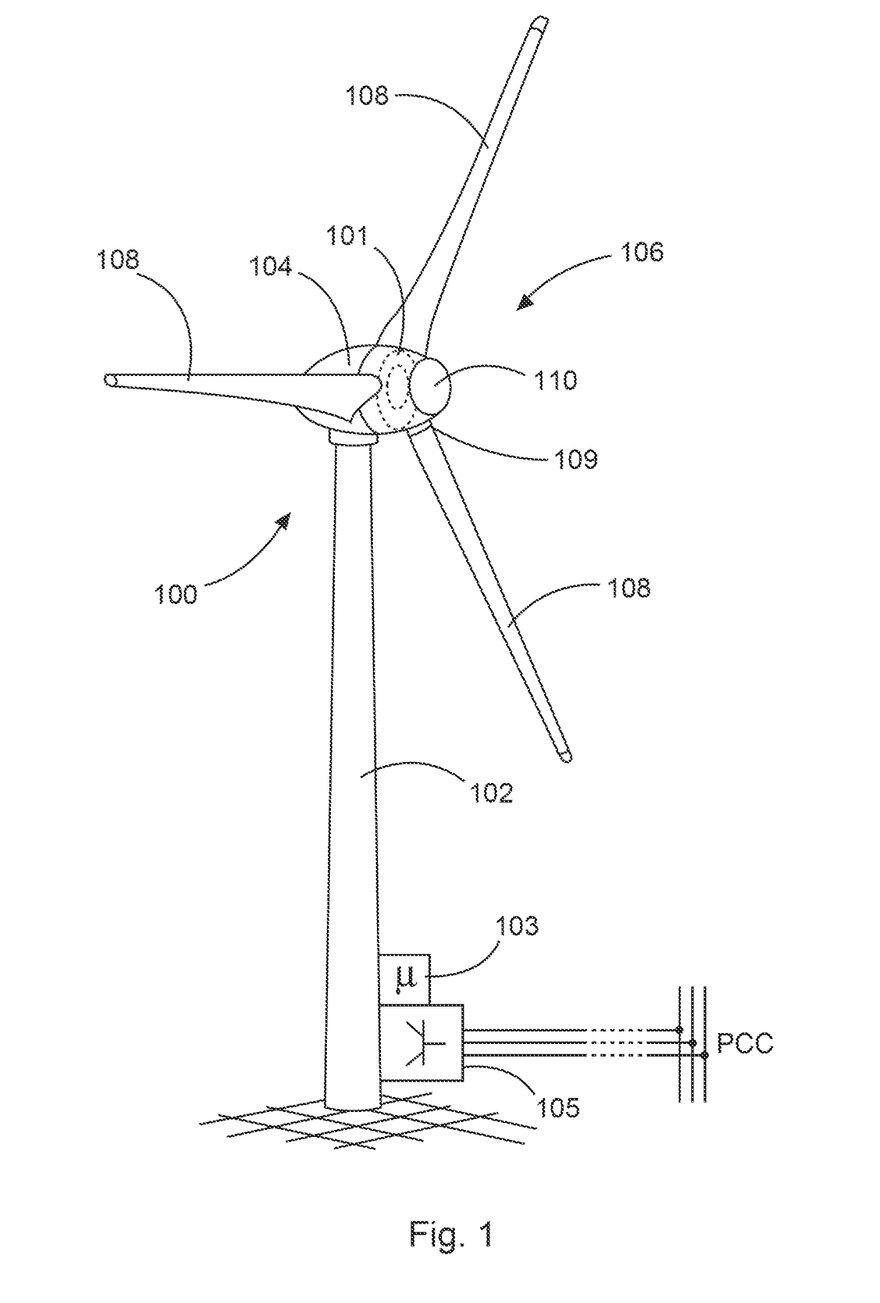
FIG. 1 shows a wind power installation in a perspective illustration.

FIG. 1 shows a wind power installation 100 with a tower 102 and a nacelle 104. A turbine rotor 106 with three rotor blades 108 and a spinner 110 is arranged on the nacelle 104. During operation, the turbine rotor 106 is set in a rotational movement by way of the wind, and drives a generator in the nacelle 104 as a result.

Here, the wind power installation 100 has an electric generator 101 which is indicated in the nacelle 104. Electric power can be generated by means of the generator 101. A feed unit 105 which can be configured, in particular, as an inverter is provided for feeding in electrical power. In this way, a three-phase feed current and/or a three-phase feed voltage can be generated according to amplitude, frequency and phase, for feeding to a point of common coupling PCC. This can take place directly or else together with further wind power installations in a wind farm. A system controller 103 which can comprise or form the control device is provided to control the wind power installation 100 and also the feed unit 105. The system controller 103 can also receive specified values from outside, in particular from a central farm computer.

Figure 2:
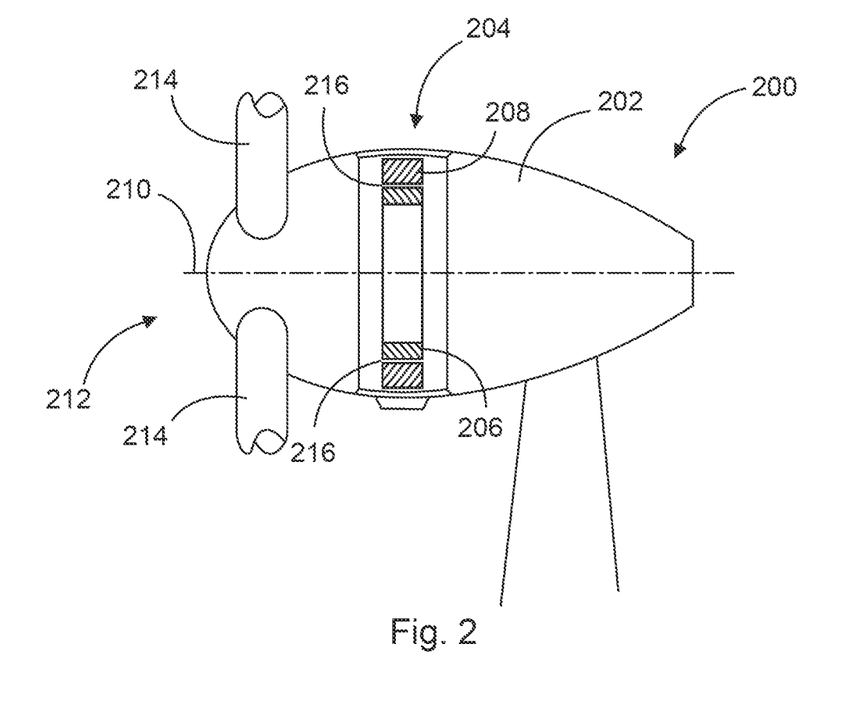
FIG. 2 shows a nacelle of a wind power installation in a sectioned and a simplified illustration.

FIG. 2 shows a nacelle 202 of a wind power installation 200 which can also correspond to the wind power installation 100 of FIG. 1. The nacelle 202 shows a generator 204, and the nacelle 202 is shown in a sectioned manner in the region of the generator 204. The generator 204 is also shown in a sectional illustration.

The generator 204 is configured as an annular generator, and shows substantially a rotor 206 and a stator 208. Here, the generator is configured as an internal rotor, with the result that the rotor 206 rotates in the stator 208. A rotational axis 210 is likewise illustrated.

The illustration is highly simplified, with the result that a connection between the rotor 206 and the turbine rotor 212 with its indicated rotor blades 214 is not shown, but is of course present.

The generator 204 has an air gap 216 between the rotor 206 and the stator 208.

The generator 204 is therefore configured as an annular generator because the rotor 206, the air gap 216 and the stator 208 are configured in a substantially annular manner at a great spacing around the rotational axis 210. In addition, the generator 204 is configured as a permanently excited synchronous generator, which cannot be gathered from the detailed illustration. Therefore, various permanent magnets are arranged in the rotor 206 in the circumferential direction. During operation of the wind power installation, the rotor 206 therefore heats up to a small extent, and at any rate not as a result of electric currents in the rotor 206 because they are not present.

By way of rotation of the rotor 206, a stator current is therefore generated in the stator 208, and this can be output, in order to output the generated electric power as a result. This necessary winding of the stator 208 is also not shown in this illustrative depiction, but is well known to a person skilled in the art.

During running operation, more pronounced heating of the stator 208 and of the rotor 206 is therefore fundamentally to be expected. If the generator 204 therefore heats up, this relates substantially to the stator 208 which expands as a result. As a consequence, the thickness of the air gap 216 increases. The thickness of the air gap 216, that is to say the air gap thickness, is therefore the spacing between the rotor 206 and the stator 208 in the region of the air gap 216.

Figure 3:
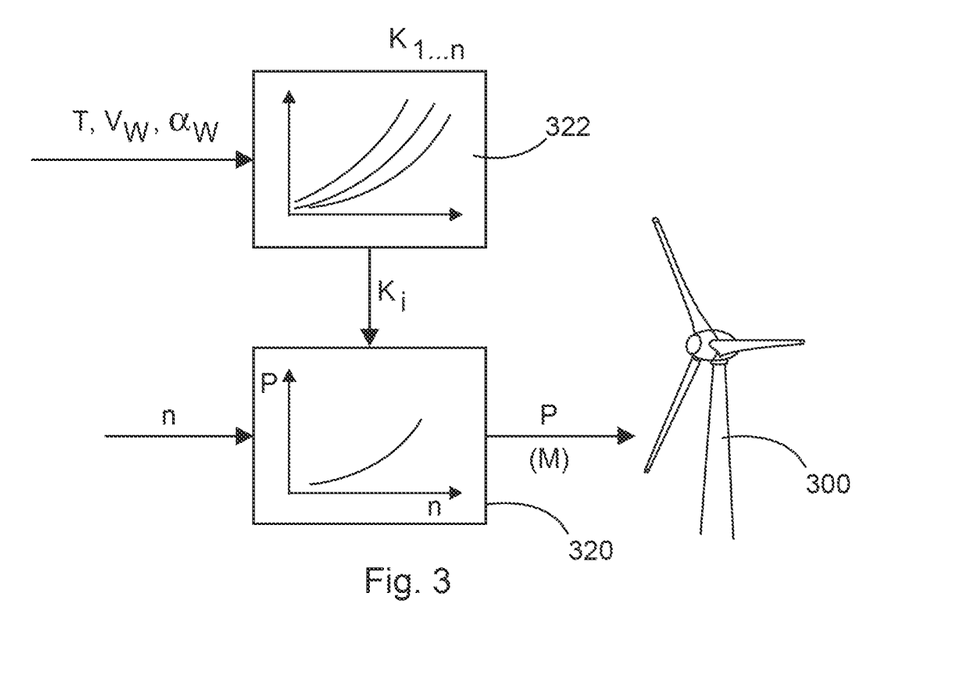
FIG. 3 diagrammatically shows a control diagram for controlling a wind power installation.

FIG. 3 shows a control diagram which is intended to illustrate the control operation of the wind power installation 300. A substantial part of the control operation of the wind power installation 300 which can correspond to the wind power installation 100 of FIG. 1 or 200 of FIG. 2 is a control regulation in accordance with the control block 320 (e.g., system controller 103). This control block 320 receives, as input signal, a rotational speed of the turbine rotor, and therefore also of the rotor in the case of a gearless wind power installation, and determines a power output P in a manner which is dependent thereon. The power output P is that power output which is set as output power of the generator in the case of the wind power installation. Here, the direct output power of the generator or the output power of the wind power installation can be set. These power outputs differ substantially as a result of power losses which are negligible here for the explanation described herein.

In order to select the output power P in a manner which is dependent on the rotational speed n, a rotational speed characteristic curve is used which is illustrated symbolically in the control block 320. It is indicated in parentheses at the output of the control block 320 that, instead of a rotational speed/power output characteristic curve, a rotational speed/torque characteristic curve also comes into consideration, and is therefore indicated as an alternative. Further setting variables such as, in particular, the intermediate circuit voltage also come into question, however.

It is then proposed that a control regulation (namely implemented here by way of the rotational speed/power output characteristic curve) which is implemented in the control block 320 can be changed. The change can be carried out by virtue of the fact that the rotational speed/power output characteristic curve, or other control regulations, is adjusted or swapped and/or set or selected. For setting purposes, for example, parameters can be changed or set.

FIG. 3 illustrates the variant that a selection is carried out between various possible control regulations, namely rotational speed/power output characteristic curves here. This is illustrated in the specification block 322 (e.g., system controller 103). Therefore, a plurality of rotational speed/power output characteristic curves are stored in the specification block 322, of which each can per se (depending on the situation) form an optimized rotational speed/power output characteristic curve. In particular, they are optimized aerodynamically, while adhering here to at least one noise specification.

In particular, one of the stored rotational speed/power output characteristic curves can be selected in order to adhere to a noise specification, in particular the specification of a maximum sound pressure level at an emissions point. As has been stated, these are also representative for other possible control regulations which can be stored here, for example functionally specified relationships between the rotational speed and power output or the rotational speed and torque or the rotational speed and intermediate circuit voltage.

The selection of the rotational speed/power output characteristic curve takes place at least in a manner which is dependent on the temperature T, the wind speed VW and the wind direction αW. It has been recognized here, in particular, that the temperature T has an influence on the air gap thickness, and different rotational speed/power output characteristic curves are appropriately specified in a manner which is dependent on the air gap thickness. Characteristic curves of this type are stored here in the symbolic specification block 322.

It is therefore then proposed for one of the rotational speed/power output characteristic curves to be selected in a manner which is dependent on the temperature T, the wind speed VW and the wind direction αW. Further boundary conditions can also be taken into consideration, however, such as, for example, an air density or air humidity. This is not illustrated in FIG. 3 for the sake of simplicity. Boundary conditions of this type are also not shown in the following figures, in order not to clutter the figures.

The rotational speed/power output characteristic curves which are stored in the specification block 322 are stored as K1 to Kn. One of these rotational speed characteristic curves is selected and transmitted to the control block 320 in a manner which is dependent on the input variables. Accordingly, the characteristic curve Ki is transmitted.

It also comes into question, however, that the wind speed and/or the wind direction are/is not taken into consideration. The wind speed VW can fundamentally be taken into consideration by way of the selected characteristic curve. The consideration of the wind direction αW is of significance, in particular, when only one emissions point is to be taken into consideration which lies in a known direction with respect to the wind power installation. If, however, the sound pressure level at an identical distance all around the wind power installation with identical values is to be taken into consideration, the consideration of the wind direction can be superfluous.

One variable which is appropriately to be taken into consideration as boundary condition is the air humidity which is also mentioned here representatively for other boundary conditions such as the air pressure and the air temperature. In the case of the air humidity and the other two mentioned boundary conditions, it is to be taken into consideration, in particular, that they do not change so rapidly. Accordingly, a control regulation, that is to say, in particular, a rotational speed/power output characteristic curve or another characteristic curve, can be selected in a manner which is dependent on a boundary condition of this type, without it being necessary for it to be changed again before long.

At any rate, FIG. 3 therefore illustrates this control diagram and, in the ideal case, a rotational speed/power output characteristic curve Ki or another control regulation is found and is transferred to the control block 320, which controls the wind power installation in an optimum manner, while a prescribed sound pressure level is still specifically adhered to.

Figure 4:
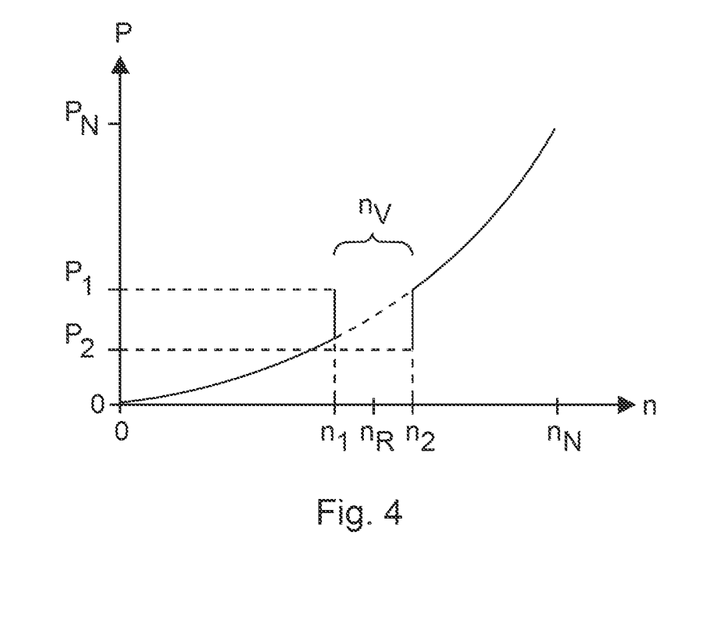
FIG. 4 illustrates a possible control regulation which comprises a rotational speed avoidance control operation, on the basis of a characteristic curve.

FIG. 4 shows a diagram of a control regulation which comprises a rotational speed avoidance control operation. In FIG. 4, a rotational speed/power output characteristic curve is also again used by way of example. This therefore specifies a relationship between a detected rotational speed n and a power output P which is to be set in a manner dependent on it.

In addition, however, there is a resonance rotational speed nR here, in the case of which a vibration of the wind power installation can possibly be excited. It is to be noted here that a resonance rotational speed which excites a vibration does not absolutely have to mean that what is known as a resonance catastrophe is also to be expected as a result. It also comes into question that merely a very high development of noise occurs at or in the vicinity of the resonance rotational speed.

At any rate, it comes into question that at least one rotational speed/power output characteristic curve which might namely be stored in the specification block 322 of FIG. 3 comprises a rotational speed avoidance control operation. It possibly comes into question here that the development of noise is still acceptable even at the resonance rotational speed in the case of particularly large gap thicknesses. This would mean that rotational speed/power output characteristic curves both with and without a rotational speed avoidance control operation can be stored in the specification block 322, referring back to this again for illustrative purposes. With the selection of the suitable rotational speed/power output characteristic curve, a selection would then also be carried out as to whether a rotational speed avoidance control operation is implemented or not.

At any rate, a rotational speed/power output control operation can be realized in such a way that a rotational speed avoidance range nV around the resonance rotational speed nR is provided in the rotational speed/power output characteristic curve, or other control regulations. This rotational speed avoidance range nV can be characterized by a lower limit rotational speed n1 and an upper limit rotational speed n2. If the working point on the rotational speed/power output characteristic curve reaches the lower limit rotational speed n1 in the case of an increasing rotational speed, the power output becomes stronger, namely is increased vertically in the ideal case, with the result that the rotational speed does not increase further. Here, the power output can increase as far as an upper power output limit value P1. If the wind speed then increases further and would lead to an even higher power output, the value of the power output can then be decreased from the upper power output limit value P1 to the lower power output limit value P2. In this way, the rotational speed would increase very rapidly and pass rapidly through the region (shown using dashed lines) of the rotational speed/power characteristic curve, and would then in each case continue further above the upper limit rotational speed n2.

Conversely, in the case of a decreasing rotational speed, the upper limit rotational speed n2 would be reached and the power output would then be decreased greatly, in order to prevent a further decrease in the rotational speed. If a predefined lower power output limit P2 is reached, the power output can then be changed rapidly to the value of the upper power output limit P1. This brakes the wind power installation, with the result that the rotational speed decreases rapidly to the lower limit rotational speed n1. In this way, the rotational speed avoidance range will also be passed through rapidly as a result.

It is proposed here, in particular, that precisely a characteristic curve of this type (as shown in FIG. 4) can be selected in a manner which is dependent on the air gap thickness or, as an alternative, in a manner which is dependent on the temperature T. In the case of the selection, it can come into question that characteristic curves without a rotational speed avoidance control operation can also be used, but it can also come into question that the rotational speed avoidance control operation is of different configuration depending on the characteristic curve. In particular, the lower and upper limit rotational speed n1 and n2 can be set or specified differently, as can likewise the upper and lower power output limit P1 and P2.

Figure 5:
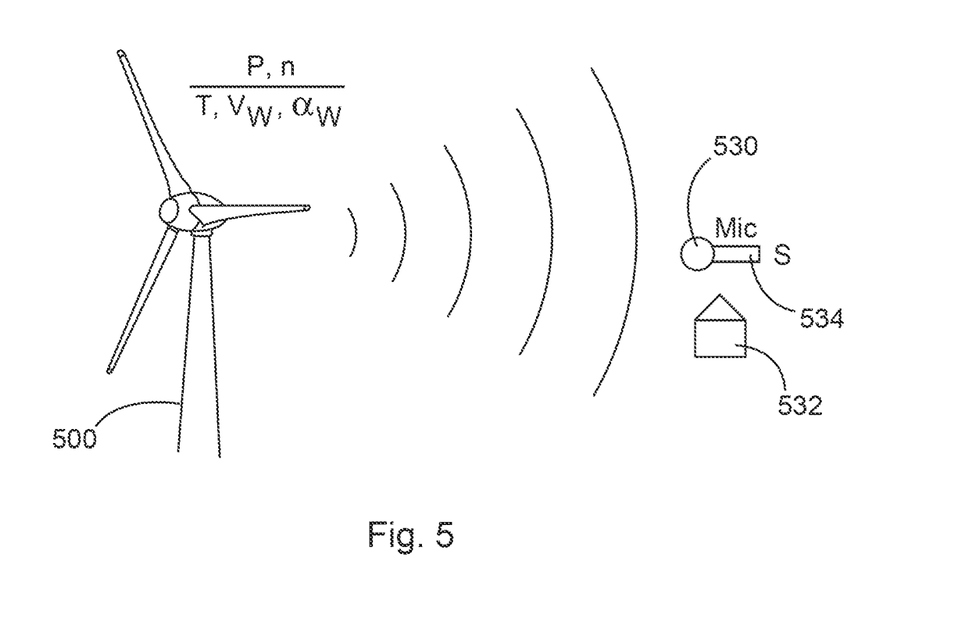
FIG. 5 diagrammatically shows an arrangement of a wind power installation and a relevant emissions point.

FIG. 5 illustrates an arrangement of a wind power installation 500 at an noise emissions point 530, at which, for example, a residential building 532 can be located.

In FIG. 5, sound pressure waves are indicated which propagate from the wind power installation 500 to the noise emissions point 530 or the residential building 532. Otherwise, the wind power installation 500 can also correspond here to one of the previous wind power installations 100, 200 or 300.

The sound pressure level at the noise emissions point 530 is dependent on many parameters. To this end, some are mentioned by way of example in FIG. 5 above the wind power installation 500. Separated by a horizontal line, the parameters of the power output P and the rotational speed n are above it. They are values which are set at the wind power installation. Moreover, a generator temperature T, a wind speed VW and a wind direction αW can have an influence. These cannot be set and are therefore below the horizontal line. Further or different boundary conditions also come into question, however, such as air humidity, air pressure or air temperature. The air temperature is to be distinguished from the generator temperature T which is shown in FIG. 5. The air temperature can, in particular, have an influence on the propagation of the sound.

Based on these values which are shown and the measurement of the sound pressure level S at the sound emissions point 530, which is likewise indicated there by way of the letter S and the symbolized microphone 534, relationships can be drawn up.

Figure 6:
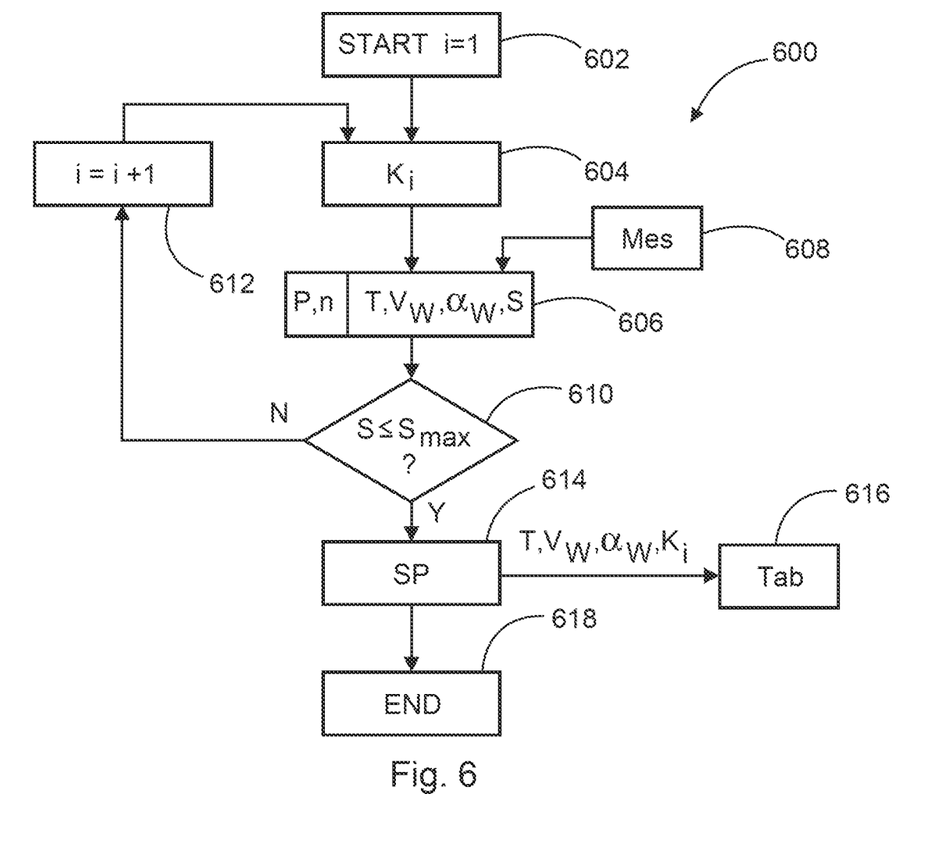
FIG. 6 shows a flow chart for training a relationship between the air gap thickness or temperature, auxiliary conditions and a control regulation which is to be assigned.

The flow chart of FIG. 6 illustrates a possible evaluation of the relationships which are recorded in accordance with the arrangement or the construction of FIG. 5.

The starting point can be considered to be that, for example, a plurality of characteristic curves or other control regulations have been predefined for optimum operation of the wind power installation, for example in simulations. For the sake of improved illustration, reference is made here again to a rotational speed/power output characteristic curve. The following explanations, in respect of the selection of the rotational speed/power output characteristic curves, can also be used mutatis mutandis, however, in order instead to determine individual operating points and to then compile them to form rotational speed/power output characteristic curves. This would accordingly make a more frequent run through of the sequence depicted in the following text necessary.

The flow chart 600 of FIG. 6 begins with a start block 602. Initial values can be set in the start block 602. This is illustrated here, in particular, on the basis of a numbering of possible rotational speed/power output characteristic curves. The start therefore takes place with the first one, with the result that the variable i assumes the value 1. By way of this start value, the wind power installation is then operated with a corresponding operating characteristic curve k1 in the operation block 604. Operation of the wind power installation with the characteristic curve Ki therefore forms the basis in the operation block 604.

The sequence then proceeds further to the recording block 606, in which values are recorded. The values include firstly operating values of the wind power installation such as the power output P and the rotational speed n, and secondly measured values or measurable values which are not set but at any rate result indirectly from the operation of the wind power installation. These include the generator temperature T, the wind speed VW, the wind direction αW and the sound pressure level S. These two different categories are separated from one another symbolically by way of a vertical line in the recording block 606.

The measuring block 608 is provided for the measured values or measurable values, which measuring block can detect these values. In particular, it can comprise the microphone 534 according to FIG. 5 or can obtain values from a microphone of this type and can therefore detect the sound pressure level S.

The other mentioned variables, in particular the generator temperature T, can also be measured. Indirect measurements also come into question, however. For instance, the wind speed VW can be derived from the operating characteristic curve which is used and the resulting rotational speed. The wind direction can be derived from an orientation of the wind power installation, that is to say an azimuth position, or this azimuth position can even correspond to this wind direction.

At any rate, the flow chart continues in the interrogation block 610. There, the detected sound pressure level S is compared with a maximum permissible sound pressure level Smax. If this sound pressure level S is greater than the maximum permissible sound pressure level Smax, a different operating characteristic curve has to be used. As an alternative or in addition, the difference from the level of the surrounding frequency range could therefore also be used here as maximum value in addition to or instead of an absolute maximum value. For this purpose, the noise of the turbine rotor blades and/or other relevant noise sources of the system, and/or the background noise at the emissions point can preferably also be estimated or measured.

Depending on the result of the comparison, regardless of how the maximum value is defined, the interrogation block 610 branches to the increase block 612. There, for example, a counter is increased by a value, and this increased counter is transmitted to the operating block 604 which thereupon uses a correspondingly different operating characteristic curve. This is also to be understood symbolically, in particular, and other possibilities than incrementing of course also come into question.

For example, a more precise evaluation of the sound pressure level S can also take place, that is to say how greatly it exceeds the maximum permissible value. Conversely, it of course also comes into question that the maximum permissible sound pressure level Smax is undershot greatly, which should likewise lead to a change in the operating characteristic curve or another change in the control regulation.

At any rate, the chart provides here that the operation of the wind power installation which is symbolized by way of the operating block 604 is continued with a changed control regulation or operating characteristic curve. The parameters are then likewise detected again in the recording block, also with assistance of the measuring block 608, and the interrogation according to the interrogation block 610 is repeated.

This is repeated until it emerges in the interrogation block 610 that the detected sound pressure level S no longer lies above the limit value. The procedure then continues to the storage block 614. This stands for the fact that the operating characteristic curve last used is considered to be optimum, since it is the first, in the case of which the sound pressure level S has been adhered to. To this end, the associated values can then be stored.

To this end, the operating characteristic curve Ki which is found to be optimum is stored in a table in the table block 616 with respect to the generator temperature T and, in particular, further boundary conditions. The further boundary conditions can be the wind speed VW and the wind direction αW, but also, in addition or as an alternative, the air temperature, air humidity and air pressure. FIG. 6 shows merely by way of example the wind speed VW and the wind direction αW in a representative manner for further or different boundary conditions.

Conversely, the optimum operating characteristic curve Ki can therefore be read out from the table in a manner which is dependent on the generator temperature T and possibly the further boundary conditions. If this operating characteristic curve is then used for the operation of the wind power installation, this leads to the sound pressure level being adhered to.

When this storage operation is concluded, a further value of the control regulation has been produced and stored in the table. This procedure is then ended, with the result that it then leads to the end with respect to block 618. If conditions, in particular boundary conditions, then change, the procedure according to FIG. 6 can start over, however, in order to determine a further value for the table.

FIG. 6 therefore shows a flow chart, by way of which control regulations can be determined. This flow chart can be used during running operation of the system, but this operation for producing various control regulations (e.g., system controller 103) is ideally concluded at some point; in particular when the table is complete. It can also be provided, however, that this procedure is repeated occasionally even if the table is filled, in order for it to be possible for any adaptations to be performed. It also comes into question that a check is made in respect of boundary conditions as to whether there are values suitable for them in the table. It can be sufficient here that some values are present in each case in the vicinity, with the result that the current operating point can be interpolated.

It also comes into question, in particular, that the microphone which is shown symbolically in FIG. 5 and the reference sign 534 is not installed permanently, but rather only as long as the wind power installation is being measured, that is to say until the table according to the table block 616 is substantially filled.

Figure 7:
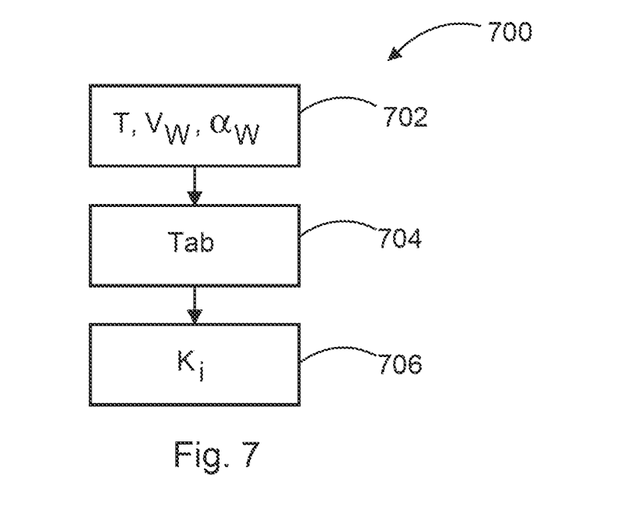
FIG. 7 shows a flow chart for selecting a control regulation.

Operation of the wind power installation then takes place in the ideal case as illustrated in FIG. 7. The flow chart 700 of FIG. 7 begins with the boundary condition block 702. There, in particular, the air gap thickness and/or the generator temperature T and further boundary conditions can be recorded. The wind speed VW and the wind direction αW are also illustrated here as boundary conditions for consistency with the previous figures. It also comes into question, however, that additional or different boundary conditions are used, such as the abovementioned boundary conditions of air pressure, air humidity and air temperature. Otherwise, the air density is also a possible boundary condition for this example and all previous examples.

A control regulation is then called up according to the table block 704 from the table which forms the basis, by way of these values of air gap thickness or generator temperature and optionally at least one further boundary condition. The table which was filled by way of the flow chart of FIG. 6 is then therefore used.

By way of the input data, the table according to table block 704 then results in a control regulation which is also represented here by the characteristic curve Ke. Accordingly, the wind power installation can be operated with this characteristic curve, in particular rotational speed/power output characteristic curve, in the operating block 706. The result should then be that the wind power installation is operated in an optimum manner, with adherence to the sound pressure level Smax, for example, at the emissions point 530 of FIG. 5.

The following has been recognized, in particular and in a manner which is not restricted to the above embodiments, and the following solutions have been proposed.

Heating of the generator of the wind power installation occurs as a result of relatively long operating times. This heating leads to the expansion of the structure and therefore to a change in the air gap between the stator and the rotor, namely the rotor of the generator, which is also called a rotor 206 for improved differentiation with respect to an aerodynamic turbine rotor 106. A considerable expansion of the air gap has been observed, which expansion led to a decrease in the accelerations in at least several measuring positions. This acceleration denotes, in particular, accelerations of sections of the generator in the radial direction, in particular in the sense of a mechanical vibration. By implication, it has been recognized that the "cold" state is therefore to be considered to be unfavorable, and it affords a higher probability of leading to a tonality as a result of radiation of tones.

The idea is then to design the operation in the cold state or in the case of a small air gap (this possibly exists even in the case of a highly homogeneously heated generator) to be different than what is generally the case. The following possibilities come into question in this regard:

A decrease in the power output at a given rotational speed is proposed, in order to decrease the exciting forces. Rotational speed exclusion areas, that is to say rotational speed avoidance ranges, can be provided. Here, leapfrogging of a critical rotational speed range is provided. An adaptation of a USoll characteristic curve can be provided which specifies a dependence of an intermediate circuit voltage to be set and the rotational speed.

It has been recognized, in particular, that a solution or improvement can be achieved by way of variable and/or problem-driven optimization of the operation.

As a result, an optimization of the annual energy production (AEP yield) can be achieved. A tonality decrease in critical operating states can be achieved. To this end, in particular, a merely temporary adaptation of operation, that is to say operating points with regard to sound, is appropriate, instead of providing a permanent reduction in the operating point, in order to again take changed sound situations into consideration.

As a result, variants can be improved, in the case of which operation is adapted permanently in critical ranges if there are tonal anomalies. This might lead to a decrease in the annual energy production (an AEP loss), since adaptations of the operating point are frequently afflicted by losses in the degree of efficiency.

In particular, a temporary adaptation of operation is proposed, in order to decrease the tonal excitation of the generator only in critical states. The air gap, or the air gap thickness and a temperature or temperature distribution in the generator have been recognized as an indicator for this.

It is particularly advantageous for the temperature sensors which are installed in the generator or an installed air gap measurement sensor to be utilized, in order to estimate the generator state. Depending on the heating/air gap state, the current operation can then be adapted, in order to decrease the tonality tendency.

It is advantageous that an adaptation is necessary merely temporarily, which leads to an increase in the annual energy production (AEP increase).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for controlling a wind power installation, wherein the wind power installation includes:
   a generator configured to generate electric current, wherein the generator has an air gap with a variable air gap thickness, and
   wherein the method comprises:
   controlling the wind power installation in a part load range using control regulation; and
   selecting or setting the control regulation depending on the air gap thickness to control a tonality of the wind power installation.

2. The method according to claim 1, wherein:
   controlling the wind power installation using the control regulation includes controlling the wind power installation using an operating characteristic curve control operation and setting a generator state variable using an operating characteristic curve,
   the operating characteristic curve specifies a relationship between a detected rotational speed and the generator state variable, and
   the operating characteristic curve is selected or modified to select or set the control regulation.

3. The method according to claim 1, wherein:
controlling the wind power installation depending on the air gap thickness or selecting or setting the control regulation depending on the air gap thickness includes:
- detecting the air gap thickness using one or more sensors,
- estimating the air gap thickness from at least one detected temperature or temperature distribution,
- estimating the air gap thickness from at least one radial acceleration value, and/or
- accounting for the air gap thickness indirectly via parameters that influence the air gap thickness.

4. The method according to claim 2, wherein:
setting the generator state variable includes setting an output power, a generator torque, or an intermediate circuit voltage of an inverter that actuates the generator.

5. The method according to claim 4, wherein:
setting the generator state variable includes setting the operating characteristic curve depending on the detected rotational speed.

6. The method according to claim 1, wherein:
- the wind power installation is a gearless wind power installation,
- the generator is a permanently excited synchronous generator, and/or
- the generator is configured as an internal rotor.

7. The method according to claim 1, wherein:
controlling the wind power installation using the control regulation includes performing a rotational speed avoidance control operation to control the wind power installation such that an operation of the wind power installation in a rotational speed avoidance range is avoided, and
the rotational speed avoidance range representing a rotational speed range in which the operation of the wind power installation is to be avoided.

8. The method according to claim 7, comprising:
- selecting or setting the rotational speed avoidance control operation depending on the air gap thickness, and/or
- selecting or setting the control regulation such that the rotational speed avoidance control operation is selected or set depending on the air gap thickness.

9. The method according to claim 7, wherein the rotational speed avoidance control operation controls the wind power installation such that the rotational speed avoidance range is passed through in response to decreasing or increasing wind, in order to set an operating point with a rotational speed below or above the rotational speed avoidance range.

10. The method according to claim 4, comprising:
- in response to the air gap thickness decreasing, selecting or setting the control regulation to decrease the output power, decrease the generator torque and/or increase the intermediate circuit voltage,
- in response to the air gap thickness decreasing, activating or setting a rotational speed avoidance control operation such that an operation of the wind power installation in a rotational speed avoidance range is avoided, and/or
- setting the rotational speed avoidance control operation to increase the rotational speed avoidance range, and/or shifting the rotational speed avoidance control operation in a direction of a higher or lower rotational speed.

11. The method according to claim 1, comprising:
- selecting or setting the control regulation depending on a detected and/or estimated air gap thickness and/or a generator temperature; and
- selecting or setting the control regulation depending on at least one boundary condition from a list of boundary conditions including:
  - an air density,
  - an air pressure,
  - an air humidity,
  - a wind speed,
  - a wind direction,
  - a wind shear, and/or
  - an atmospheric stratification.

12. The method according to claim 1, comprising:
using a setting regulation to select or set the control regulation depending on a detected or estimated air gap thickness and/or depending on a generator temperature and in addition in a manner which is dependent on at least one boundary condition, wherein the setting regulation specifies selection or setting the control regulation such that noise emissions of the wind power installation comply with a predefined noise emissions limit at an emissions point.

13. The method according to claim 12, comprising:
using the setting regulation to select or set the control regulation depending on at least one boundary condition.

14. The method according to claim 1, wherein the tonality is controlled to stay below a predefined limit.

15. A wind power installation, comprising:
- a generator configured to generate electric current, where in the generator has an air gap with a variable air gap thickness; and
- a controller configured to:
  - control the wind power installation in a part load range using control regulation; and
  - select or set the control regulation depending on the air gap thickness to control a tonality of the wind power installation.

16. The wind power installation according to claim 15, wherein:
- the wind power installation is a gearless wind power installation,
- the generator is a permanently excited synchronous generator, and/or
- the generator is configured as an internal rotor.

* * * * *